Feb. 7, 1933.    J. W. HAMILTON ET AL    1,896,582
FISHING REEL
Filed Feb. 8, 1932

James W. Hamilton,
Joel W. Watts,
INVENTORS

BY J. Stanley Rinch
ATTORNEY.

Patented Feb. 7, 1933

1,896,582

UNITED STATES PATENT OFFICE

JAMES WILLIAM HAMILTON AND JOEL WALKER WATTS, OF BILOXI, MISSISSIPPI

FISHING REEL

Application filed February 8, 1932. Serial No. 591,684.

This invention relates to fishing reels and more patricularly to a novel construction of means to permit free and rapid rotation of the spool when casting or paying out the line, although the spool is positively rotated by the crank handle in a direction to wind the line thereon.

More specifically stated, the invention provides an automatically operable spool clutch, embodying spring influenced dogs normally engaging the driven pinion of the spool operating mechanism, and which dogs are separated therefrom by centrifugal force on rotation of the spool while paying out the line, and automatically reengage said pinion so that the spool may be rotated by the crank handle to wind the line thereon.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein.

Figure 1:
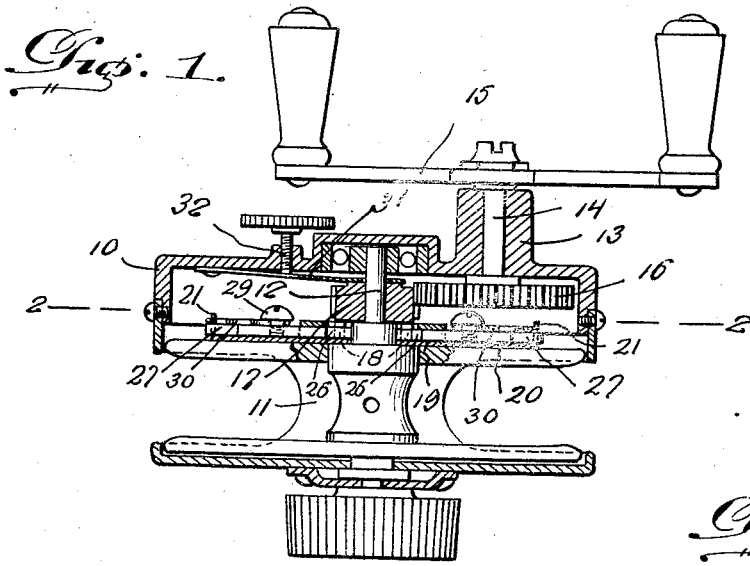
Figure 1 is a view in elevation partly in section of a fishing reel constructed in accordance with the invention.
Figure 3:
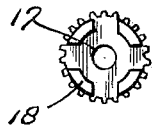
Figure 3 is an end elevation of the driven pinion.
Figure 2:
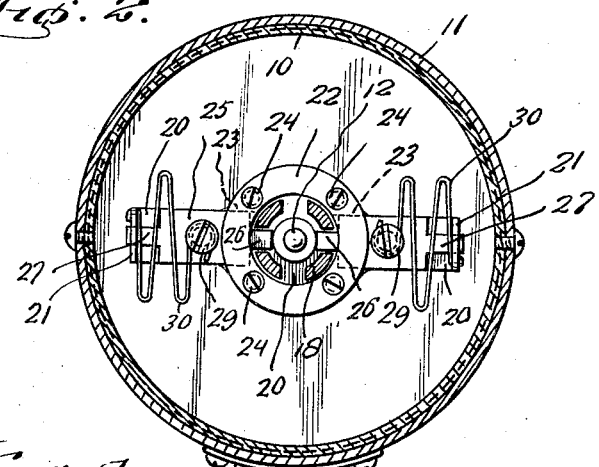
Figure 2 is a sectional view on line 2—2 of Figure 1.

Referring to the drawing in detail 10 indicates a casing in which the spool 11 and the operating mechanism therefor is arranged, the spool including the usual shaft 12. These parts are of ordinary well known construction. Journaled in a boss 13 is a shaft 14 to which is secured the handle 15 forming part of the spool operating mechanism. This mechanism includes a gear 16 secured to the lower end of the shaft 14 and meshing with a pinion 17 loosely mounted on the shaft 12 of the spool.

As hereinabove stated the present invention comprehends the provision of an automatically operable clutch for the spool, whereby the latter is permitted to both freely and rapidly rotate, independently of the operating mechanism therefor while casting or paying out the line, although the spool is positively rotated by the operating mechanism to wind the line thereon. This clutch includes the pinion 17 which is provided with opposed slots 18 for a purpose to be hereinafter described.

The clutch also includes a base plate 19 secured to the spool 11 about the shaft 12, and which base plate is formed with reduced lateral extensions 20, each terminating at its outer end to form an upwardly projecting slotted flange 21. It will be noted that the extensions 20 are diametrically opposed and may vary in length without departing from the inventive idea. Also surrounding the shaft 12 and secured to the base plate 19 is a ring 22 having diametrically opposed channels 23. The ring may be an integral part of the base plate, but is preferably secured thereto by fastening elements 24.

Figure 4:
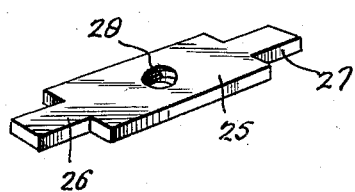
Figure 4 is a view of one of the dogs.

Slidably mounted on each extension 20 is a spring influenced dog of the character illustrated in Figure 4. It will be noted in this view that each dog consists of a flat elongated member 25 of uniform width, from the opposite ends of which project lugs 26 and 27 respectively. The dog is also formed with a central threaded opening 28 to accommodate a headed element 29. When the dog is mounted on its particular extension 20 of the base plate, it is normally arranged in the adjacent channel 23 of the ring 22 with the lug 26 normally received by the adjacent slot 18 of the driven pinion 17, while the other lug 27 slides through the slot in the flange 21 of said extension. The dog is normally maintained in this position through the instrumentality of a spring, which may vary in construction, and which may also be associated with the dog in various ways without departing from the spirit of the invention. I have illustrated a coil spring 30 for this purpose, one end of the spring being attached to the headed element 29 of the dog, while the opposite end of the spring is suitably secured to the flange 21 of the extension 19 of the base plate. The dogs 25 are automatically operable, in that they normally engage the driven pinion 17, but when the spool is rotated to cast or pay out the line, the dogs 25 are moved outwardly by centrifugal force away from the pinion, thereby permitting the spool free and rapid rotation. After the line has been cast and the spool retarded in its rotation, the springs 30 automatically return the dogs 25 to their normal position in engagement with the pinion 17, whereby the spool can be rotated by the handle 15 to wind the line thereon. By virtue of the construction herein illustrated and described, it is manifest that the spool may be rotated in either a clockwise or anti-clockwise direction while paying out the line, and that the dogs 25 are guided in their sliding movements and associated with the extension of the base plate in a manner to prevent casual separation therefrom.

Bearing against the pinion is a resilient brake arm 31, one end of which is secured to the casing 10. An adjustable threaded element 32 is carried by the casing and utilized to vary the pressure of the brake element 31 against the pinion as will be readily understood.

While it is believed that from the foregoing description the nature and advantages of the invention will be readily apparent, we desire to have it understood that we do not limit ourselves to what is herein illustrated or described and that such changes may be resorted to when desired as fall within the scope of what is claimed.

What is claimed is:

1. The combination in a fishing reel having a spool and shaft therefor, of an automatically operable clutch, including a driven pinion loosely mounted on the shaft and having slots therein, a base plate secured to the spool about the shaft, a ring secured to the plate and having opposed channels, and spring influenced dogs slidable on said plate through said channels and normally received by the adjacent slots of the pinion, and movable therefrom by centrifugal force incident to the rapid rotation of the spool.

2. The combination in a fishing reel having a spool and shaft therefor, of an automatically operable clutch, including a driven pinion loosely mounted on the shaft and having slots, a base plate secured to the spool about the shaft and having opposed extensions, a ring secured to said plate and having diametrically opposed channels in the bottom thereof, spring influenced dogs slidably mounted on said extensions and through said channels, means for guiding said dogs in their movements, and a lug carried by the inner end of each dog and normally received by the adjacent slot of said pinion, and movable therefrom by centrifugal force incident to the rapid rotation of the spool.

3. The combination in a fishing reel having a spool and shaft therefor, of an automatically operable clutch including a driven pinion loosely mounted on the shaft and having slots, a base plate secured to the spool about the shaft and having opposed extensions, slotted flanges rising from the outer ends of said extensions, a ring secured to said plate and having opposed channels in the bottom thereof, spring influenced dogs slidable on said extensions and through said channels, lugs projecting from the opposed ends of each dog, one of said lugs sliding through the slotted flange of said extension, and the other dog being normally received by the adjacent slot of the pinion and movable therefrom by centrifugal force incident to the rotation of the spool.

In testimony whereof we affix our signatures.

JAMES WILLIAM HAMILTON.
JOEL WALKER WATTS.